(12) United States Patent
Prakash et al.

(10) Patent No.: US 9,138,688 B2
(45) Date of Patent: *Sep. 22, 2015

(54) APPARATUS AND PROCESS FOR TREATMENT OF WATER

(71) Applicants: Prakhar Prakash, Danville, CA (US); James Craig Pauley, Bakersfield, CA (US); Randall B. Pruet, Katy, TX (US)

(72) Inventors: Prakhar Prakash, Danville, CA (US); James Craig Pauley, Bakersfield, CA (US); Randall B. Pruet, Katy, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/624,846

(22) Filed: Sep. 21, 2012

(65) Prior Publication Data

US 2013/0075335 A1    Mar. 28, 2013

Related U.S. Application Data

(60) Provisional application No. 61/537,666, filed on Sep. 22, 2011, provisional application No. 61/537,661, filed on Sep. 22, 2011, provisional application No. 61/537,682, filed on Sep. 22, 2011.

(51) Int. Cl.
*B01D 61/36* (2006.01)
*B01D 61/58* (2006.01)
(Continued)

(52) U.S. Cl.
CPC .......... *B01D 61/364* (2013.01); *B01D 61/002* (2013.01); *B01D 61/58* (2013.01);
(Continued)

(58) Field of Classification Search
CPC .......... C02F 1/463; C02F 1/444; C02F 1/445; C02F 1/447; C02F 9/00; C02F 2209/06; C02F 2209/10; C02F 2209/20; B01D 71/024; B01D 61/002; B01D 61/364; B01D 61/58; B01D 61/145; B01D 63/02
USPC .......... 210/640, 702, 703, 738, 650, 651, 652
See application file for complete search history.

(56) References Cited

U.S. PATENT DOCUMENTS 3,171,804 A    3/1965 Rice
3,254,719 A    6/1966 Root
(Continued)

FOREIGN PATENT DOCUMENTS

WO    2008144099    11/2008
WO    WO 2008/144099    * 11/2008
(Continued)

OTHER PUBLICATIONS

Hayes et al. Overview of emerging produced water treatment technologies. The 11th Annual International Petroleum Environmental Conference. Oct. 12-15, 2004. 36 pages.*
(Continued)

*Primary Examiner* — Katherine Zalasky
(74) *Attorney, Agent, or Firm* — John E. Vick

(57) ABSTRACT

The invention relates to the treatment of water, including for example treatment in connection with hydrocarbon production operations. Silica in water produces undesirable scaling in processing equipment, which causes excess energy usage and maintenance problems. Electrocoagulation (EC) at relatively high water temperature followed by ultra-filtration (UF filtration) may be combined with forward osmosis (FO) to treat water. Water to be treated may be produced water that has been pumped from a subterranean reservoir. The treated water may be employed to generate steam. The treatment units (e.g., EC, forward osmosis, UF filtration, etc) can be configured into one system as an on-site installation or a mobile unit for on-site or off-site water treatment.

15 Claims, 2 Drawing Sheets

(51) Int. Cl.
  *C02F 1/463* (2006.01)
  *C02F 1/44* (2006.01)
  *C02F 9/06* (2006.01)
  *B01D 63/02* (2006.01)
  *C02F 9/00* (2006.01)
  *B01D 61/00* (2006.01)
  *B01D 71/02* (2006.01)
  *B01D 61/14* (2006.01)

(52) U.S. Cl.
  CPC ............. *B01D 63/02* (2013.01); *B01D 71/024* (2013.01); *C02F 1/463* (2013.01); *C02F 9/00* (2013.01); *B01D 61/145* (2013.01); *C02F 1/444* (2013.01); *C02F 1/445* (2013.01); *C02F 1/447* (2013.01); *C02F 2209/06* (2013.01); *C02F 2209/10* (2013.01); *C02F 2209/20* (2013.01); *Y10T 29/494* (2015.01)

(56) References Cited

U.S. PATENT DOCUMENTS

| | | |
|---|---|---|
| 3,262,877 A | 7/1966 | Le Compte, Jr. |
| 3,838,774 A | 10/1974 | Dolan et al. |
| 3,844,349 A | 10/1974 | Snavely, Jr. et al. |
| 3,918,521 A | 11/1975 | Snavely, Jr. et al. |
| 3,976,569 A | 8/1976 | Sheppard et al. |
| 4,007,786 A | 2/1977 | Schlinger |
| 4,036,749 A | 7/1977 | Anderson |
| 4,081,148 A | 3/1978 | Murphy |
| 4,108,768 A | 8/1978 | Sebelik et al. |
| 4,152,274 A | 5/1979 | Phillips et al. |
| 4,160,727 A | 7/1979 | Harris, Jr. |
| 4,280,912 A | 7/1981 | Berry, III et al. |
| 4,321,145 A | 3/1982 | Carlson |
| 4,392,944 A | 7/1983 | Kessick |
| 4,418,651 A | 12/1983 | Wyatt |
| 4,428,841 A | 1/1984 | Favret, Jr. |
| 4,460,472 A | 7/1984 | Kapiloff et al. |
| 4,466,885 A | 8/1984 | Ronden |
| 4,474,011 A | 10/1984 | Nelson et al. |
| 4,528,093 A | 7/1985 | Winer |
| 4,587,518 A | 5/1986 | King |
| 4,627,922 A | 12/1986 | Viator et al. |
| 4,728,428 A | 3/1988 | Broussard, Sr. |
| 4,730,577 A | 3/1988 | Houghton |
| 4,752,399 A | 6/1988 | Viator et al. |
| 4,784,763 A | 11/1988 | Hambleton et al. |
| 4,800,023 A | 1/1989 | Arthun et al. |
| 4,808,287 A | 2/1989 | Hark |
| 4,872,991 A | 10/1989 | Bartels et al. |
| 4,889,638 A | 12/1989 | Rockford et al. |
| 4,913,236 A | 4/1990 | Reed |
| 4,981,599 A | 1/1991 | Stewart, Jr. |
| 4,983,297 A | 1/1991 | Kaczmarek et al. |
| 5,006,234 A | 4/1991 | Menon et al. |
| 5,006,249 A | 4/1991 | Green et al. |
| 5,009,787 A | 4/1991 | Broussard, Sr. |
| 5,038,091 A | 8/1991 | Bashark |
| 5,059,317 A | 10/1991 | Marius et al. |
| 5,100,546 A | 3/1992 | Broussard, Sr. |
| 5,104,545 A | 4/1992 | Means et al. |
| 5,135,656 A | 8/1992 | Means et al. |
| 5,250,185 A | 10/1993 | Tao et al. |
| 5,266,203 A | 11/1993 | Mukhopadhyay et al. |
| 5,266,210 A | 11/1993 | McLaughlin |
| 5,330,650 A | 7/1994 | Byrne et al. |
| 5,403,490 A | 4/1995 | Desai |
| 5,435,909 A | 7/1995 | Burrows |
| 5,439,592 A | 8/1995 | Bellos et al. |
| 5,468,394 A | 11/1995 | Bader |
| 5,486,294 A | 1/1996 | Brown |
| 5,512,167 A | 4/1996 | Gramms et al. |
| 5,587,088 A | 12/1996 | Bader |
| 5,597,487 A | 1/1997 | Vogel et al. |
| 5,615,764 A | 4/1997 | Satoh |
| 5,656,173 A | 8/1997 | Jordan et al. |
| 5,665,783 A | 9/1997 | Katzakian, Jr. et al. |
| 5,695,643 A | 12/1997 | Brandt et al. |
| 5,833,867 A | 11/1998 | Hensley |
| 5,865,991 A | 2/1999 | Hsu |
| 5,879,546 A | 3/1999 | Burford |
| 5,879,563 A | 3/1999 | Garbutt |
| 5,915,851 A | 6/1999 | Wattrick et al. |
| 5,925,255 A | 7/1999 | Mukhopadhyay |
| 5,965,029 A | 10/1999 | Simon et al. |
| 6,013,180 A | 1/2000 | Wang |
| 6,080,313 A | 6/2000 | Kelada |
| 6,164,379 A | 12/2000 | de Oliveira et al. |
| 6,190,558 B1 | 2/2001 | Robbins |
| 6,296,773 B1 | 10/2001 | McMullen et al. |
| 6,365,051 B1 | 4/2002 | Bader |
| 6,372,143 B1 | 4/2002 | Bradley |
| 6,461,514 B1 | 10/2002 | Al-Samadi |
| 6,536,523 B1 | 3/2003 | Kresnyak et al. |
| 6,582,605 B2 | 6/2003 | Krulik et al. |
| 6,616,839 B1 | 9/2003 | Peterson et al. |
| 6,663,778 B1 | 12/2003 | Bader |
| 6,675,747 B1 | 1/2004 | Goidich et al. |
| 6,716,355 B1 | 4/2004 | Hanemaaijer et al. |
| 6,733,636 B1 | 5/2004 | Heins |
| 6,827,865 B1 | 12/2004 | Fenwick |
| 6,875,351 B2 | 4/2005 | Arnaud |
| 6,984,292 B2 | 1/2006 | Kresnyak et al. |
| 7,022,240 B2 | 4/2006 | Hart et al. |
| 7,025,884 B2 | 4/2006 | Mueller et al. |
| 7,037,434 B2 | 5/2006 | Myers et al. |
| 7,048,852 B2 | 5/2006 | Ballard |
| 7,077,201 B2 | 7/2006 | Heins |
| 7,093,663 B1 | 8/2006 | Bader |
| 7,144,510 B2 | 12/2006 | Mueller et al. |
| 7,150,320 B2 | 12/2006 | Heins |
| 7,291,272 B2 | 11/2007 | Bourke et al. |
| 7,392,848 B1 | 7/2008 | Bader |
| 7,428,926 B2 | 9/2008 | Heins |
| 7,438,129 B2 | 10/2008 | Heins |
| 7,501,064 B2 | 3/2009 | Schmidt et al. |
| 7,501,065 B1 | 3/2009 | Bader |
| 7,510,656 B2 | 3/2009 | Shafer et al. |
| 7,514,500 B2 | 4/2009 | Eldridge et al. |
| 7,520,993 B1 | 4/2009 | Laraway et al. |
| 7,527,736 B2 | 5/2009 | Shafer et al. |
| 7,540,965 B2 | 6/2009 | Sengupta et al. |
| 7,591,309 B2 | 9/2009 | Minnich et al. |
| 7,681,643 B2 | 3/2010 | Heins |
| 7,694,736 B2 | 4/2010 | Betzer Tsilevich |
| 7,699,104 B2 | 4/2010 | Tsilevich |
| 7,717,174 B2 | 5/2010 | Heins |
| 7,718,054 B2 | 5/2010 | Duplessis et al. |
| 7,731,854 B1 * | 6/2010 | Herbst .......................... 210/651 |
| 7,763,666 B2 | 7/2010 | Vero et al. |
| 7,789,159 B1 | 9/2010 | Bader |
| 7,815,804 B2 | 10/2010 | Nagghappan |
| 7,824,552 B2 | 11/2010 | Slabaugh et al. |
| 7,837,866 B2 | 11/2010 | Burrows |
| 7,849,921 B2 | 12/2010 | Heins |
| 7,901,578 B2 | 3/2011 | Pruet |
| 7,934,551 B1 | 5/2011 | Bader |
| 7,955,505 B2 | 6/2011 | Mendes et al. |
| 7,963,338 B1 | 6/2011 | Bader |
| 7,967,955 B2 | 6/2011 | Heins |
| 7,981,298 B2 | 7/2011 | Alper |
| 8,047,287 B2 | 11/2011 | Minnich et al. |
| 8,105,488 B2 | 1/2012 | Shafer et al. |
| 8,167,143 B2 | 5/2012 | Sirkar et al. |
| 8,197,696 B1 | 6/2012 | Bader |
| 8,252,171 B2 | 8/2012 | Doran |
| 2002/0100729 A1 | 8/2002 | Bradley |
| 2003/0127226 A1 | 7/2003 | Heins |
| 2003/0127400 A1 | 7/2003 | Kresnyak et al. |
| 2003/0141250 A1 * | 7/2003 | Kihara et al. ................. 210/652 |
| 2004/0031742 A1 | 2/2004 | Arnaud |
| 2004/0050786 A1 | 3/2004 | Dey et al. |
| 2004/0112812 A1 | 6/2004 | Kawabe et al. |

(56) References Cited

U.S. PATENT DOCUMENTS

| | | |
|---|---|---|
| 2004/0118783 A1 | 6/2004 | Myers et al. |
| 2004/0168964 A1 | 9/2004 | Lambert et al. |
| 2005/0022989 A1 | 2/2005 | Heins |
| 2005/0023228 A1 | 2/2005 | Fenwick |
| 2005/0131083 A1 | 6/2005 | Dancuart Kohler et al. |
| 2005/0167357 A1 | 8/2005 | Inoue et al. |
| 2005/0279500 A1 | 12/2005 | Heins |
| 2005/0284814 A1 | 12/2005 | Mairal et al. |
| 2006/0032630 A1 | 2/2006 | Heins |
| 2006/0138031 A1 | 6/2006 | Kloos et al. |
| 2006/0150814 A1 | 7/2006 | Goksoyr et al. |
| 2006/0213821 A1 | 9/2006 | Choi et al. |
| 2006/0219613 A1 | 10/2006 | Scheu et al. |
| 2006/0226081 A1 | 10/2006 | Lupton et al. |
| 2006/0249390 A1 | 11/2006 | Yan et al. |
| 2007/0051513 A1 | 3/2007 | Heins |
| 2007/0084793 A1 | 4/2007 | Wenden |
| 2007/0102359 A1 | 5/2007 | Lombardi et al. |
| 2007/0259232 A1 | 11/2007 | Yang et al. |
| 2008/0053896 A1 | 3/2008 | Shafer et al. |
| 2008/0058576 A1 | 3/2008 | Shafer et al. |
| 2008/0073200 A1 | 3/2008 | Godshall et al. |
| 2008/0110630 A1 | 5/2008 | Minnich et al. |
| 2008/0156709 A1 | 7/2008 | Johnson |
| 2008/0210635 A1 | 9/2008 | Alper |
| 2008/0287323 A1 | 11/2008 | Li et al. |
| 2009/0032446 A1* | 2/2009 | Wiemers et al. ............ 210/85 |
| 2009/0078416 A1 | 3/2009 | Heins |
| 2009/0107915 A1 | 4/2009 | Skinner et al. |
| 2009/0127091 A1 | 5/2009 | Heins |
| 2009/0200230 A1 | 8/2009 | Mendes et al. |
| 2009/0208801 A1 | 8/2009 | Yang et al. |
| 2009/0261040 A1 | 10/2009 | Pruet |
| 2010/0032375 A1 | 2/2010 | Venkataraman et al. |
| 2010/0038081 A1 | 2/2010 | Gamache et al. |
| 2010/0038310 A1 | 2/2010 | Shafer et al. |
| 2010/0096326 A1 | 4/2010 | Najmy et al. |
| 2010/0224364 A1 | 9/2010 | Heins |
| 2010/0224476 A1* | 9/2010 | Cath et al. ............ 203/10 |
| 2010/0248997 A1 | 9/2010 | Li et al. |
| 2010/0264068 A1 | 10/2010 | Ikebe et al. |
| 2010/0294719 A1 | 11/2010 | Polizzotti et al. |
| 2010/0307975 A1 | 12/2010 | Johnson |
| 2010/0319535 A1 | 12/2010 | Joshi et al. |
| 2011/0000861 A1 | 1/2011 | Hutchings et al. |
| 2011/0011584 A1 | 1/2011 | Bernays et al. |
| 2011/0031100 A1 | 2/2011 | Qtaishat et al. |
| 2011/0061867 A1 | 3/2011 | Bjorklund et al. |
| 2011/0089013 A1 | 4/2011 | Sakurai et al. |
| 2011/0114566 A1 | 5/2011 | McCaw et al. |
| 2011/0155666 A1 | 6/2011 | Prakash et al. |
| 2011/0166050 A1 | 7/2011 | Li et al. |
| 2011/0203993 A1 | 8/2011 | Hughes et al. |
| 2011/0233136 A1 | 9/2011 | Enos et al. |
| 2012/0087737 A1 | 4/2012 | Minnich et al. |
| 2012/0103905 A1 | 5/2012 | Stewart |
| 2012/0108473 A1 | 5/2012 | Pich et al. |
| 2012/0118804 A1 | 5/2012 | Matza et al. |
| 2012/0132588 A1 | 5/2012 | Yu et al. |
| 2012/0137883 A1 | 6/2012 | Bradley |
| 2012/0145386 A1 | 6/2012 | Bjorklund et al. |
| 2012/0152546 A1 | 6/2012 | Polizzotti et al. |
| 2012/0152830 A1 | 6/2012 | Shafer et al. |
| 2012/0160187 A1 | 6/2012 | Bunio et al. |
| 2012/0213689 A1 | 8/2012 | Rittof et al. |
| 2012/0228219 A1 | 9/2012 | Goebel et al. |

FOREIGN PATENT DOCUMENTS

| | | |
|---|---|---|
| WO | WO2005061082 A1 | 7/2012 |
| WO | WO2012097279 A1 | 7/2012 |

OTHER PUBLICATIONS

Arthur et al. Technical summary of oil & gas produced water treatment technolgoes. All Consulting LLC. Mar. 2005. 53 pages.*
U.S. Appl. No. 13/624,845, filed Sep. 21, 2012, Prakash, et al.
U.S. Appl. No. 13/624,853, filed Sep. 21, 2012, Prakash, et al.
U.S. Appl. No. 13/624,830, filed Sep. 21, 2012, Pruet, et al.
International Search Report for PCT/US2012/056751 dated Feb. 28, 2013, 4 pages.

* cited by examiner

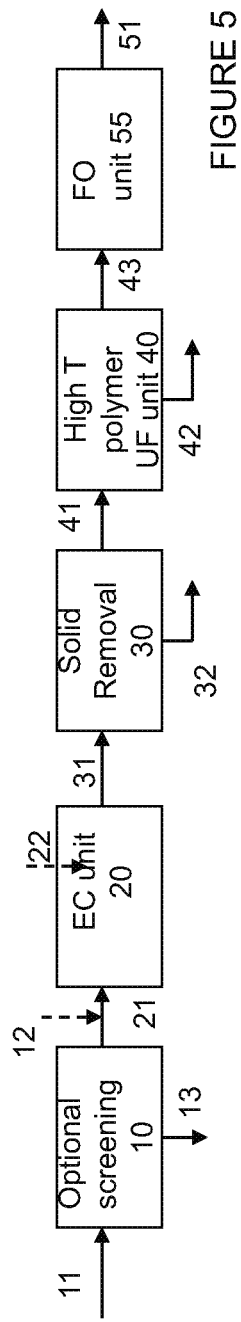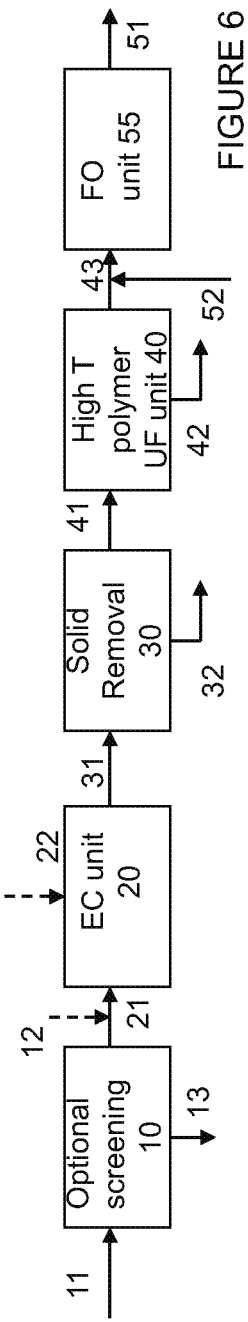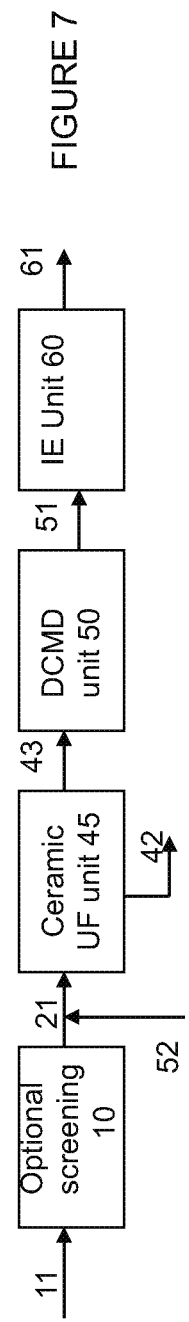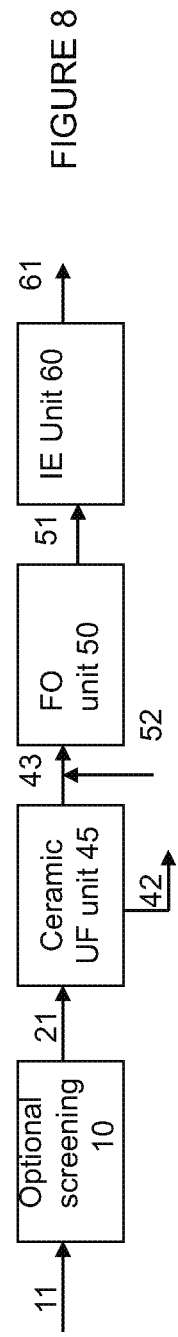
FIGURE 5
FIGURE 6
FIGURE 7
FIGURE 8

APPARATUS AND PROCESS FOR TREATMENT OF WATER

CROSS-REFERENCE TO RELATED APPLICATIONS

This application claims benefit under 35 USC 119 of U.S. Provisional Patent Application Nos. 61/537,661; 61/537,666; and 61/537,682, all with a filing date of Sep. 22, 2011.

FIELD OF THE INVENTION

The field of the invention relates to the treatment of water, including for example treatment of water in connection with hydrocarbon production operations.

BACKGROUND

For every barrel of crude oil produced, about three to ten barrels of water is produced. In the oil and energy industry, water that is drawn from the formation is referred to as "produced water." The injection of steam for heavy oil recovery has become an important enhanced oil recovery (EOR) method. In EOR, high pressure steam is injected at a rate sufficient to heat the formation to reduce the oil viscosity and provide pressure to drive the oil toward the producing wells. For EOR, steam is normally produced in steam generators, with full steam makeup of water is required to feed the generator. The feed water should be substantially free of hardness, e.g., calcium and magnesium to prevent scale formation in the steam generator tubes or in the oil formation, causing plugging of downhole injection lines, causing increased pressure drop and increasing the power demand on pumps. Silica at high concentration can also pose a precipitation problem with scaling in steam generators and associated pipelines. Since fresh water is not always available for EOR, the treatment of produced water in the oil recovery process becomes necessary.

It is desirable to reduce the levels of silica and hardness to improve the efficiency of steam generators and simultaneously reduces the carbon generation to the atmosphere by reduction of natural gas consumption in the production of steam. Residual amount of free oil in the produced water also causes inefficiencies in the steam generators. Oil needs to be separated from the water for further processing, and such separation is a major issue in production operations. High efficiency reverse osmosis ("RO") membranes reduce silica and hardness to negligible concentrations. The process desalinates the produced water—which further improves the quality of steam produced. However, reverse osmosis processes are energy intensive and generate significant pumping costs. The amount of free oil in water is a deterrent in steam generation processes, as it may cause significant fouling of reverse osmosis membranes. Materials that may undesirably serve to decrease reverse osmosis efficiency are free oil, dissolved organics, silica, magnesium ions and calcium ions.

There is a need for alternative and improved methods to treat produced water to avoid undesirable scale build-up within processing equipment.

SUMMARY

In one aspect, a system and method of treating produced water is disclosed. The produced water is treated to remove contaminants including but not limited to silica, hardness ions, TDS, TOC, and COD. The produced water is subject to an electrocoagulation process to remove at least a portion of the silica and hardness ions as suspended solids. A substantial portion of the suspended solids are removed by at least one of floatation, sedimentation, filtering, centrifugation, settling, and combinations thereof, generating a pre-treated water. The pre-treated water is further treated in a direct contact membrane distillation (DCMD) unit, generating treated water having less than 10 mg/L TOC, less than 50 ppm silica, and less than 10 ppm hardness ions. In one embodiment, the DCMD unit employs cross-flow hydrophobic hollow fiber membranes.

In one embodiment, a high-temperature filtering device is employed to handle produced water at a temperature of at least 50° C., wherein no heat exchanger is employed to remove or add energy to the water treatment system. In one embodiment, the high-temperature filtering device is a ceramic ultra-filtration unit. In another embodiment, a high temperature polymeric membrane is used in the filtering unit.

In one embodiment instead of or in addition to membrane distillation, the water treatment process includes a forward osmosis membrane separation process to produce high quality desalinated water.

In another aspect, the invention relates to a system for treating produced water containing contaminants selected from the group of dissolved organics, free oil and grease, and TDS as silica and hardness ions. The system comprises: an electrocoagulation unit for treating the produced water to remove silica and hardness ions from the produced water as suspended solids to generate a pre-treated produced water stream having a LSI from −3 to 3; a filtration unit employing at least a membrane to remove free oil and grease from the pre-treated produced water at a temperature of at least 50° C., generating a filtered water stream with a reduced concentration of free oil and grease; a membrane distillation unit for removing at least 90% of dissolved organic content from the filtered water stream with a reduced concentration of free oil and grease; a forward osmosis unit for removing at least 90% of dissolved organic content from the filtered water stream with a reduced concentration of free oil and grease. The units in the system are configured in a permutable fashion for the units to be interconnected and interchangeable for the water treatment system to operate in: a sequential mode with the individual units running sequentially; a parallel mode with at least two of the units running in parallel; a combination of parallel and sequential mode; all units online; at least one unit online and at least one unit being idle; and combinations thereof.

BRIEF DESCRIPTION OF THE FIGURES

FIG. 5 is a block diagram showing a variation of the system/process configuration of FIG. 4, wherein forward osmosis is used to further treat the produced water.

FIG. 6 is a block diagram showing yet another variation of the system/process configuration of FIG. 4, wherein the produced water stream feed is split with some untreated water being combined with the treated water as feed to the forward osmosis unit.

FIG. 7 is a block diagram illustrating a system/process configuration to treat a produced water stream with a relatively low level of silica, with treatment in an ion exchange unit to remove hardness.

FIG. 8 is a block diagram illustrating a variation of the system/process configuration in FIG. 7, wherein an untreated produced water stream is mixed with the treated stream for further treatment.

DETAILED DESCRIPTION OF THE INVENTION

Figure 1:
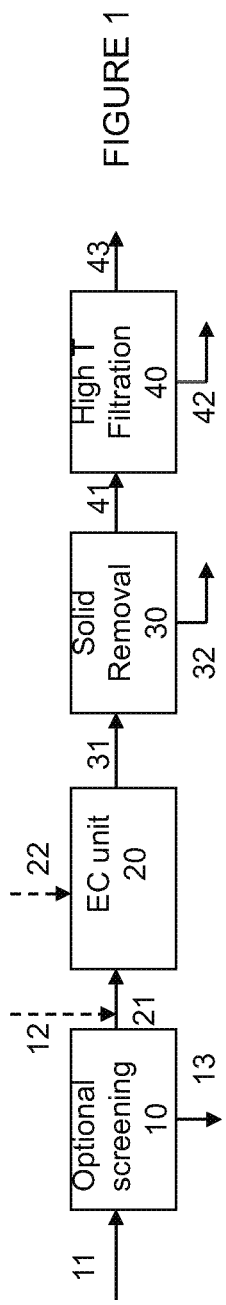
FIG. 1 is a block diagram of a system/process configuration employing an EC unit in conjunction with high-temperature filtration to treat produced water.

The following terms will be used throughout the specification and will have the following meanings unless otherwise indicated.

"ppm" refers to parts per million. One ppm is equivalent to 1 mg per liter.

LSI refers to the Langelier Saturation index, an equilibrium model derived from the theoretical concept of saturation and provides an indicator of the degree of saturation of water with respect to calcium carbonate. It can be shown that the Langelier saturation index (LSI) can be correlated to the base 10 logarithm of the calcite saturation level. The Langelier saturation level approaches the concept of saturation using pH as a main variable. The LSI can be interpreted as the pH change required to bring water to equilibrium. Water with a negative LSI means that there is little or no potential for scale to form, with the water typically dissolving $CaCO_3$. If the LSI is positive, scale will typically form and $CaCO_3$ precipitation will typically occur.

"Flowback water" refers to return water from fracking operations in shale gas plays.

"Fracking" may be used interchangeably with hydraulic fracturing, referring to a technique used to release petroleum, natural gas (including shale gas, tight gas and coal seam gas), or other substances for extraction as a result of the action of a pressurized fluid such as the injection of water into the formation.

"Produced water" may be used interchangeably with "production water," referring to water separated from the production of stream and gas wells, including but not limited to tar sand wastewater, oil shale wastewater, water from steam assisted gravity drainage oil recovery process, and flowback water.

"Silica" ($SiO_2$) will be used to refer generally to silica-based compounds.

"Absorbing" or absorption refers to a method or apparatus in which absorbants, such as active carbon, are used to absorb impurities in the water.

"FPSO" (floating production, storage and offloading) vessel refers to a vessel or a platform located over or near a subsea well site, a near-shore separation facility, or an onshore separation facility. Synonymous terms include "production facility" or "gathering facility."

"Steam-generation quality water" refers to water having less than 10 mg/L TOC ("total organic carbon"), less than 50 ppm silica, and less than 10 ppm hardness ions.

In the process of producing oil, "produced water" is generated during oil production as a waste stream. In many instances, this waste stream can be seven or eight times greater than oil produced at any given oil field. Some of this water can be re-injected to the well for pressure maintenance, some is injected to deep well for final disposal in the case of proper aquifer conditions, and some is reclaimed for use as oilfield steam generator feed-water. Large amount of water is typically needed for steam generation. Large amount of energy is needed to create steam from water. The produced water, which is not re-injected to the production well such as reclaimed water for steam generation, has to be treated. Produced water has distinctive characteristics due to organic and inorganic matters, potentially causing fouling and limiting steam generator reliability, and ultimately oil production. The invention relates to improved processes and systems for the treatment of produced water, e.g., water for use in steam generation, including of electrocoagulation pretreatment, lime (chemical) precipitation pretreatment, ceramic ultra-filtration, forward osmosis (FO), membrane distillation, and combinations thereof.

Produced Water Feed:

Produced water feed to the treatment process typical contains both inorganic and organic constituents that limit the discharge options, e.g., dispersed oil, dissolved or soluble organics, produced solids, scales (e.g., precipitated solids, gypsum ($CaSO_4$), barite ($BaSO_4$)), bacteria, metals, low pH, sulfates, naturally occurring radioactive materials (NORM), and chemicals added during extraction. The produced water contains at least 1,000 mg/L TDS in one embodiment, at least 5,000 mg/L TDS in a second embodiment, and at least 10,000 mg/L TDS in a fourth embodiment. In some locations, the produced water may have TDS concentrations of at least 150,000 mg/L. In terms of hardness level (as Mg, Ca, Sr, Ba), the concentration may range from 200-2000 mg/L Mg; from 5000 to 40,000 mg/L Ca, from 1000-10,000 mg/L Sr, and from 1000-10,000 mg/L Ba.

The oil related compounds in produced water include benzene, xylene, ethyl benzene, toluene, and other compounds of the type identified in the sample analysis shown in Table 1 and in other crude oil and natural gas sources. The amount of TOC as free oil and grease can be substantially higher as shown when there is an occasional process upset. Normally, the production water will also contain metals, e.g., arsenic, barium, iron, sodium and other multivalent ions, which appear in many geological formations, as illustrated in Table 1 for an example of produced water from Wellington, Colo. after oil water separation in an API separator:

TABLE 1

| Produced Water Quality Parameters after separation | mg/l | mg/l |
|---|---|---|
| Inorganics | | |
| Total Dissolved Solids (TDS) | 1200 | 6000 |
| Total Hardness as $CaCO_3$ | 30 | 300 |
| Total Alkalinity as $CaCO_3$ | 1000 | 4000 |
| Chloride (Cl) | 40 | 1000 |
| Fluoride | <1 | 10 |
| Phosphate ($PO_4$) | <0.5 | 30 |
| Nitrite + Nitrate-Nitrogen ($NO_2 + NO_3$—N)* | <0.5 | 40 |
| Metals | | |
| Antimony (Sb) | <0.005 | 1.00 |
| Arsenic (As)* | <0.005 | 1.00 |
| Barium (Ba)* | 3.00 | 30.00 |
| Berylium (Be) | <0.0005 | 1.00 |
| Cadmium (Cd) | <0.001 | 1.00 |
| Chromium (Cr) | <0.02 | 1.00 |
| Copper (Cu) | <0.01 | 1.00 |
| Iron (Fe)* | 0.10 | 30.00 |
| Lead (Pb) | <0.005 | 5.00 |
| Manganese (Mn)* | <0.005 | 10.00 |
| Mercury (Hg) | <0.0002 | 0.10 |
| Nickel (Ni)* | <0.05 | 10.00 |
| Selenium (Se) | <0.005 | 5.00 |
| Silver (Ag) | <0.01 | 5.00 |
| Thallium (Tl)* | <0.002 | 1.00 |
| Zinc (Zn) | <0.005 | 10.00 |

TABLE 1-continued

| Produced Water Quality Parameters after separation | mg/l | mg/l |
|---|---|---|
| Organics | | |
| Oil and grease* | 20.0 | 200.00 |
| Benzene* | 1.00 | 10.00 |
| Toluene* | 1.00 | 5.00 |
| Ethylbenzene* | 0.10 | 1.00 |
| Xylenes, total* | 1.00 | 5.00 |
| n-Butylbenzene* | 0.01 | 0.50 |
| sec-Butylbenzene* | 0.01 | 0.10 |
| tert-Butylbenzene* | 0.01 | 0.10 |
| Isopropylbenzene* | 0.01 | 0.10 |
| 4-Isopropyltoluene* 0.01 0.10 | 0.01 | 0.10 |
| Naphthalene* 0.01 0.10 | 0.01 | 0.10 |
| n-Propylbenzene* 0.01 0.10 | 0.01 | 0.10 |
| 1,2,4-Trimethylbenzene* | 0.10 | 1.00 |
| 1,3,5-Trimethylbenzene* 0.10 1.00 | 0.10 | 1.00 |
| Bromoform* | <0.001 | 1.00 |

Depending on the concentration of the produced water feed, the selected pretreatment method (e.g., chemical precipitation, electrocoagulation, etc.), and the end-use applications, in some embodiments, additives such as complexing agents, coagulants, oxidizing agents (e.g., ozone, polyaluminum chloride), etc., can be added to the produced water feed upfront prior to or during the pretreatment step.

In one embodiment prior to water treatment, the produced water feed may pass through a screen or strainer to capture larger particulates, including large solids/particulates that may potentially damage or foul the blades within the EC unit.

Chemical Precipitation Pretreatment Unit:

Depending on the properties of the produced water feed, chemical precipitation (CP) can be used as a pretreatment step for the removal of silica and/or hardness, with the addition of certain reagents in amounts in excess of the silica and/or hardness ions in the produced water feed.

In one embodiment for the removal of silica, the produced water is dosed with a crystal forming compound such as magnesium oxide to remove silica, converting soluble silica to insoluble silica. The crystal forming compound forms crystals in the produced water that adsorb silica, resulting in silica being driven or pulled out of solution and adsorbed on the formed crystals. Various crystal forming materials can be added, e.g., magnesium oxide or magnesium chloride, which forms magnesium hydroxide crystals that function to absorb silica in the produced water, resulting in the conversion of silica from soluble to insoluble form. It should be noted that in the case of magnesium, there is an insufficient concentration of magnesium typically found in produced water to yield a substantial amount of magnesium hydroxide crystals. Thus, magnesium compounds are added to the produced water. In some cases, the dissolved silica and the produced water can be subsequently removed from solution by mixing the produced water with compounds having surface active properties to draw silica out of solution. Examples of such compounds are oxides of aluminum, silica and titanium.

In another embodiment to soften water removing hardness ions, lime, soda ash and/or caustic is used in the pretreatment step. Both the lime (calcium hydroxide) and caustic are mixed with the feed water. Lime converts carbon dioxide to bicarbonate ions and neutralizes the bicarbonate alkalinity of the produced water and removes calcium carbonate hardness. The caustic removes magnesium hardness present in the feed water and raises the pH of the produced water to a basic level. In one embodiment, the pH is raised to above 10.5. In many cases, the pH is maintained in the range of 10.5 to 11.5. The lime softening step can be carried out at normal raw water temperature (cold lime process) to reduce the hardness of the produced water down to 30-50 ppm, or at temperatures near or above the boiling point (hot or warm lime process) to reduce the hardness of the produced water down to 15-25 ppm.

In one embodiment, other reagents or compounds ("coagulants") can be added to the produced water instead of in addition magnesium compounds, lime, caustic. The coagulants may act to destabilize the solids generated during the softening process and further facilitates or enhances the separation of solids from the liquid in subsequent portions of the process. Examples include but are not limited to ferric chloride, aluminum oxide, aluminum chloride, aluminum sulphate, polyaluminum chloride, ferrous or ferric sulfate, calcium oxide and mixtures thereof. Dosage may vary depending on the nature and characteristics of the feed water, but in many cases, the dosage will vary in the range of 10-50 mg/l.

The pH of the produced water is maintained in the range of 9.5 to 11.2 in one embodiment, and between 10.0 and 10.8 in a second embodiment for optimum precipitation of silica. Some caustic in the form of sodium hydroxide or sodium carbonate may be added to trim the pH to a proper value.

The total hardness of the CP treated water (by lime process) is less than 10 ppm in one embodiment; less than 5 ppm in a second embodiment; and less than 1 ppm in a third embodiment. In one embodiment, the LSI value of the treated water is 0. The total (soluble) silica in the CP treated water (treatment by magnesium) is less than 50 ppm in one embodiment, and less than 25 ppm in a second embodiment.

After water passes through the CP unit, the precipitates can be subsequently removed from the oily produced water stream by means known in the art, e.g., in a solid separation unit, prior to further treatment depending on the application.

Electrocoagulation ("EC") Pretreatment Unit:

In one embodiment, electrocoagulation (EC) is employed to remove silica and hardness from the produced water instead of chemical precipitation. EC refers to a process of applying electrical current to treat and flocculate contaminants without having to add coagulations. EC consists of pairs of metal sheets called electrodes, arranged in pairs of two, anodes and cathodes. At least one of the cathode and anode is sacrificial and made from materials such as iron, aluminum, zinc, or magnesium, with the ions thereof migrate into the electrolyte and bond with impurities to create precipitates. In the EC, possible reactions that may occur on the anode surface are metal dissolution and oxygen evolution. The half-cell reactions may be any of anodic and cathodic reactions. In an example with iron being employed for the electrode, the possible anodic reactions are metal dissolution, oxygen evolution, and oxidation of metal ion to higher oxidation state, as shown below:

$$Fe = Fe2+ + 2e-$$

$$4Fe^{2+} + O2 + 4H+ = 4Fe_3+ + 2H_2O$$

$$4Fe^{2+} + O2 + 4H+ = 4Fe_3+ + 2H_2O$$

The primary cathodic reactions that may occur on the cathode surface are oxygen reduction and hydrogen evolution, which may be expressed as shown below:

$$O_2 + 4H+ + 4e- = 2H_2O$$

$$2H+ + 2e- = H_2$$

Ferric ions precipitate as ferric hydroxide. These ions function to capture constituents in the produced water such as silica within the ferric hydroxide complexes, generating precipitates, as shown below.

$$Fe^{3+} + 3OH- = Fe(OH)_3$$

As it passes through the EC cell, the coagulants introduced by the passage of electric currents through iron or aluminum electrodes in the EC chamber help reduce the concentration of silica to a low value with the formation of precipitates. The EC process is tunable, meaning that variations may be introduced to adapt to slightly changed conditions. In one embodiment by changing the amperage in the process, it is possible to manipulate/vary the amount of silica removed.

Depending on the composition of the produced water to be treated, additives may be used if needed during the electrocoagulation. For example, when non-sacrificial cathodes and anodes are used, the additives may be used to form ions to interact with solutes and particulate matter in coagulating the impurities out of suspension and solution. When sacrificial cathodes and anodes are used, additives may be used to increase the conductivity of the water stream to enhance electrocoagulation processes. The additives may be later removed, or involved in the chemical processes to form precipitates. In addition, to improve flocculation, flocculants can also be added to the electrocoagulation. In one embodiment, with the addition of an oxidizing agent such as Fenton's reagent to the EC step, the dissolved organic carbon content may be further reduced. Fenton's reagent is a commercially available solution of hydrogen peroxide and an iron catalyst that is used to oxidize contaminants or waste waters.

The EC pretreatment process is quite efficient in treating produced water from fields which have a large amount of TDS. In one embodiment with the use of iron as one of the electrodes, as coagulation is governed by the amount of ferric ions released, the dosage is dependent on the amount of current in the system based on the following equation: Fe generated $(mg/s)=I*M/Fn \cdot (1000\ mg/g)$; wherein M=Molecular weight of iron; F=Faraday's Constant (96,485 C/mol); I=Applied current (Amps/s); n=number of electrons transferred in the reaction.

As shown, when the conductivity of the solution is high, its resistance 'R' is low. For a lower voltage, the same current can be generated. The power consumption, defined as $I^2*R$ is therefore significantly reduced for the same amount of coagulant generated. This makes the process very efficient for certain applications where the hardness and silica are to be removed from sea water type salinity. Such high TDS water is commonly seen in many carbonate type subterranean reservoirs.

In some applications, EC reduces silica at least 75% of the silica in one embodiment and as much as over 90% in another embodiment, reduce hardness by about 60% to 90%, reduce dissolved organic carbon content by about 25%-50%. Additionally, depending on the composition of the produced water, the pH of the feed water to the EC unit can be optionally adjusted to a pre-select pH to optimize its operation to maximize the removal of both the silica and the hardness level. The removal of hardness materials such as calcium carbonate helps reduce scaling of further treatment units downstream, e.g., filtration membranes.

In one embodiment with the use of sacrificial electrodes, some caustic in the form of sodium hydroxide or sodium carbonate can be added to the produced water feed to adjust the pH. By changing the pH conditions of the produced water to a pre-select basic pH, at least 90% of the hardness is removed in one embodiment, at least 95% removal in a second embodiment, and at least 99% removal in a third embodiment. This pre-select pH is at least 9 in one embodiment; at least 9.5 in a second embodiment, at least 10 in a third embodiment, and at least 10.5 in a fourth embodiment for the removal of at least 90% of the silica and hardness. In yet another embodiment, the pre-select pH is maintained in the range of 7.2 to 11.5; and between 10.0 and 10.8 in another embodiment for optimum precipitation of silica. The EC treated water has a silica concentration of less than 50 ppm in one embodiment; less than 25 ppm in a second embodiment. The total hardness of the EC treated water is less than 10 ppm in one embodiment; less than 5 ppm in a second embodiment; and less than 1 ppm in a third embodiment. The LSI value of the EC treated water ranges from −3 to 3 in one embodiment; a value of 0 in a second embodiment; and a value of −2 in a third embodiment.

In one embodiment with an ultra-filtration step or a membrane distillation step downstream from the EC unit, EC treated water generates a cake layer on the membranes that is more easily cleaned than with treated water via other methods, e.g., using conventional coagulants. It is hypothesized that the cake layer formed on the membranes downstream of the EC unit are less compressible, as evolution of hydrogen gas during the EC process makes the flocs less dense and thus easier cleaning.

Besides the easier maintenance work downstream and desirable end result of high quality treated water for steam generation, the use of the EC unit in one embodiment results in an incremental increase in water temperature. The produced water enters the system is at a temperature as much as 50° C. in one embodiment, at least 70° C. in a second embodiment, and in the range of 80-90° C. in a third embodiment. As the high temperature is maintained in the EC step, then a limited amount of heat may be needed to boil the water to create steam. Additionally, the current increases the temperature of the produced water. This additional heat aids the thermal driving force downstream desalination forward osmosis/membrane distillation step.

After water passes through the EC unit, the precipitates can be subsequently removed from the oily produced water stream in a solid separation unit, prior to further treatment depending on the application.

Solid Separation Unit:

In the solid separation unit, a substantial portion of the precipitates are removed using means known in the art, e.g., floatation, sedimentation, filtering, and the like, using any of an incline plate settler, settling tank, centrifuge, hydrocyclones, or enhanced gravity separation device, or a combination thereof.

In one embodiment, the treated water is passed through a clarifier to remove precipitates, sludge, etc. In one embodiment, the clarifier comprises a settling tank, formed in the bottom of the settling tank is a sludge scraper. Once the feed water reaches the setting tank of the clarifier, solids in the form of precipitants and suspended solids will settle to the bottom of the settling tank to form sludge. Sludge is pumped from the bottom of the settling tank. The characteristics of the produced sludge is dependent on the characteristics of the feed water being treated, such as hardness, the metals contained in the feed water, and the alkalinity of the feed water. Typically in a process treating produced water, the sludge comprises predominantly iron hydroxide (60% to 70%) if iron electrodes are used, with the balance comprising insoluble compounds derived from hardeness causing ions.

After the solid separation step to remove a substantial portion of the suspended solids, the treated water may further pass through any of a filtration unit, a membrane distillation unit, a forward osmosis unit, or combinations thereof for further treatment. The removal rate (of suspended solids) is at least 80% in one embodiment, at least 90% in a second embodiment, and at least 95% in a third embodiment.

Adsorbing Unit:

In one embodiment wherein the removal of dissolved organic carbon removal is insufficient in the pretreatment step, e.g., EC or CP process, an absorbing medium such as activated carbon can be employed for the removal for on shore applications for at least 95% removal in one embodiment, and at least 99% removal in a second embodiment. In some applications, advanced oxidation using ozone generators/UV—peroxide ($H_2O_2$) may be used instead of activated carbon, such as in some offshore applications. After the optional step to remove dissolved organics, the treated water may further pass through any of a filtration unit, a membrane distillation unit, a forward osmosis unit, or combinations thereof for further treatment.

In one embodiment, the absorbing unit employs walnut shell, wherein water flows down a bed of walnut shells where oil is adsorbed and suspended solids are filtered. Black walnut shells have a unique property in that they have an equal affinity for oil and water. Since the walnut shell filters are hydrophilic, the loosely bond residual oil can be easily separated using low pressure backwashing. The unit can be pressurized to force water through the adsorbing bed to get the desired performance of at least 99% removal.

Filtration Unit:

Depending on the particular application/end-use of the treated produced water, after the CP and/or EC pretreatment and after an optional clarification step, there may still be some residual free oil and particulates (residual suspended solids) in the treated water. In one embodiment, filtration is employed to remove the free oil content ("polishing" or "polishing de-oiling") before the water can be further treated if needed, e.g., in a membrane distillation unit. In other embodiments, filtration may be bypassed if a downstream treatment step, e.g., membrane distillation unit, is tolerant to residual suspended solids and residual dissolved organics after the electrocoagulation treatment.

The filtration can be in succession with the treated produced water (from any of EC, CP, solid separation unit, carbon absorber) is directed through a number of filters in series. The filters can be staged in successive filtration sizes and capacity, from filters to ultra-filters or membranes. The filters can be of the same of different types, e.g., ceramic filtration followed by high-temperature polymeric membrane filtrations or vice versa. In one embodiment, an ultra-filtration ("UF") unit is employed. In some applications, polymeric ultra-filtration UF membranes may be employed. These UF membranes may be comprised of polyethersulfone (PES), polyacrylonitrile (PAN) or polyvinylidene difluoride (PVDF), which may operate up to a maximum of about 40-45° C. For produced water feed with at a temperature above 50° C., e.g., at about 80-90° C., the water temperature will need to be lowered before subsequent treatment in the UF step using these membrane types.

In applications handling produced water at 80° C. or more, special high-temperature polymeric membranes are employed. Examples include sulfonated polyether ether ketone (PEEK) membranes as disclosed in US Patent Publication No. 20100319535, incorporated herein by reference, NAFION® membranes (sulfonated tetrafluoroethylene based fluoropolymer-copolymer), and membranes constructed out of poly(phthalazinone ether sulfone) (PPES), poly(phthalazinone ether ketone) (PPEK) or poly(phthalazinone ether fulfone ketone) (PPESK).

In another embodiment for handling produced water at 80° C. or more, ceramic UF membranes are employed, wherein cross-flow filtration is carried out with the high-velocity produced water "crossflows" across the face of the ceramic membrane. Suitable ceramic membrane materials include titanium, alumina, zirconia, and combinations thereof (e.g., alumina membrane with zirconia coating, etc.). Depending on the produced water to be processed, and the end use application, the membranes can be micro-rated and of different sizes, e.g., ranging from 0.005 mm to about 0.2 mm in one embodiment, and from 0.005 µm to 0.02 µm in another embodiment, from 0.05-10 µm in a third embodiment, from 0.5 to 2 µm in a fourth embodiment.

The oil-free water passes through the ceramic membrane (as permeate or filtrate) while the oily waste is concentrated in a process reservoir or retained on the feed side of the membrane as retentate. With crossflow filtration, the tangential motion of the bulk of the fluid across the membrane causes trapped particles on the filter surface to be rubbed off Thus, one advantage of cross-flow filtration is that the filter cake (which can blind the filter) is substantially washed away during the filtration process, increasing the length of time that a filter unit may be operational. Cross-flow filtration can be a continuous process, operating continuously at relatively high solids loads without blinding, unlike batch-wise dead-end filtration.

In one embodiment, the ceramic UF unit comprises a stainless steel housing containing ceramic membrane elements constructed from aluminum oxide and tubular in shape. Water passes along the parallel tubes from the feed inlet to the outlet. The surfaces of the tubes are coated with a ceramic membrane material that has a uniform pore size to provide microfiltration or ultra-filtration. The feed stream may be introduced under pressure at the inlet and is withdrawn as retentate at the downstream end. Permeate passes through the membrane into the porous ceramic structure. The combined permeate from all of the tubular passageways flows through the monolith support to permeate conduits within the monolith that transport the permeate through slots to an external collection zone.

The use of ceramic membranes for the UF unit is advantageous as ceramic membranes, being inorganic, are not as prone to fouling as some of the polymeric membranes and requiring less cleaning as compared to a polymeric membrane, thereby reducing the amount of downtime and backwash cycles during the operation. In cleaning operations, ceramic membranes may withstand aggressive cleaning with sodium hydroxide, unlike most polymeric membranes, which cannot withstand a cleaning solution pH of greater than 11. The abrasive resistance of ceramic membranes makes them suitable for high total dissolved solids ("TDS") in water, when compared to the polymeric UF membranes. Ceramic membranes may be used for the entire pH range (0-14), thereby facilitating high pH treatment of water in the EC process for hardness reduction.

The use of ceramic membranes or high-temperature polymeric membranes that can withstand water high temperatures up to 130° C. (as opposed to the maximum operating temperature of about 45° C. with some polymeric UF membranes) allows the handling of produced water as is. Produced water that is very hot need not undergo any temperature reduction before entering the membrane module when using ceramic membranes, reducing overall energy consumption. In one embodiment, the use of ceramic membranes may avoid the cost of heat exchangers employed for heat integration and reduces associated energy losses in heat integration. With the use of ceramic or high-temperature polymeric membranes in the UF unit, generating a relatively high temperature water with sensible heat that may be gainfully utilized downstream of the UF unit.

The filtration unit can remove at least 70% of the TOC as free oil in one embodiment; at least 90% of the TOC as free oil in a second embodiment; and at least 95% in a third embodiment, for an final free oil level of less than 10 ppm in one embodiment and less than 100 ppm in a second embodiment. In some embodiments, treated water from the ultra-filtration unit may be fed into other units in the water treatment process, e.g., a forward osmosis unit or a membrane distillation unit. In yet another embodiment, the outflow from the filtration unit is first treated in a gas floating unit, with the addition of an agent to help float the oil/particles to the top of the tank for removal prior to optional treatment downstream.

Forward Osmosis Unit:

Osmosis is the molecular diffusion of solvent across a semi-permeable membrane, which rejects the solute. Osmosis is driven by a chemical potential gradient. This gradient is caused by differences in component concentration, pressure and/or temperature across the membrane. In the non-ideal case, the use of solvent activity in lieu of the concentration accounts for the solvent-solute interactions. At a constant temperature, the chemical potential may be defined by: $\mu_i = \mu_i^\circ + RT \ln a_i + V_i P$, where is the chemical potential of 1 mol of pure substance at a pressure P and temperature T, $a_i$ is the activity of component i (1 for pure substances), R is the gas constant and $V_i$ is the molar volume of component i.

The driving force is defined as the osmotic pressure of the concentrated solution. The membrane permeable species (solvent) diffuses from the region of higher activity to a region of lower activity. The osmotic pressure is the pressure that must be applied to a concentrated solution to prevent the migration of solvent from a dilute solution across a semi-permeable membrane. A common application of this phenomenon is the desalination of seawater using "reverse osmosis (RO)" using hydraulic pressure to overcome the osmotic pressure, (also, known as hyperfiltration). It is used to reverse the flow of the solvent (water) from a concentrated solution (e.g. seawater) to obtain potable water.

Osmotic pressure can be calculated from the activity (the product of the mole fraction (x) and activity coefficient (γ)) of the solvent in the two solutions. The relationship is as follows:

$$\Delta \pi = \frac{RT}{V_i} \ln\left[\frac{x^1 \gamma^1}{x^2 \gamma^2}\right]$$

wherein R is the gas constant, T is the temperature, $V_i$ is the molar volume of the solvent (water), x1 and $\gamma_1$, $x^2$ and $\gamma^2$ refer to the water mole fraction and activity coefficients in the higher activity and lower activity solutions respectively.

In the absence of the hydraulic pressure for reverse osmosis, the solvent flow will continue until the chemical potential equalizes in both the feed and the draw solution. This 'natural' flow of solvent is called forward osmosis.

In one embodiment, forward osmosis (FO) is employed for the removal of dissolved organic content in the water. In an example illustrating the difference among FO, PRO ("pressure retarded osmosis") and RO for the same solvent flows of a feed (dilute solution) and brine (concentrated solution). For FO, ΔP is approximately zero and water diffuses to the more saline side of the membrane. For PRO, water diffuses to the more saline liquid that is under positive pressure (Δπ>ΔP). For RO, water diffuses to the less saline side due to hydraulic pressure (ΔP>Δπ). For FO, ΔP is zero; for RO, ΔP>Δπ (osmotic pressure); and for PRO, Δπ>ΔP. A general flux relationship for FO, PRO and RO for water flux from higher activity to lower activity (i.e. FO) is as follows: $J_w = A(\sigma \Delta \pi - \Delta P)$, wherein A is the water permeability constant of the membrane, σ the reflection coefficient, and ΔP is the applied pressure difference. The reflection coefficient accounts for the imperfect nature (solute rejection less than 100%) of the membrane. The reflection coefficient is 1 for complete solute rejection.

By choosing an appropriate salt in the draw solution in the FO unit, it is possible to pull water from a feed solution of produced water. In the FO method, produced water is introduced into the FO feed chamber, wherein it is separated into a retentate stream containing contaminants in the feed chamber and a permeate stream (depleted in contaminants such as dissolved organics, TDS, free oil, etc.) in the FO draw chamber which is mixed with the draw solution to form an outlet draw solution. In one embodiment, the draw solution comprises polyvalent osmotic ions or monovalent osmotic ions. In another embodiment, the draw solution comprises an alkaline earth metal salt solution with a halide. Examples include but are not limited to NaCl, $Na_2SO_4$, $AlCl_3$, $MgSO_4$, $NH_4HCO_3$, $MgCl_2$ and mixtures thereof.

The FO process has several potential benefits over RO including but not limited to: less membrane fouling tendencies; less membrane support and equipment used; less energy intensive process via efficient heat integration, by treating the draw solution at a high temperature (>50° C.) to recover desalinated water; and lessening the need for several unit operations. FO treatment is efficient in removing particulate matters and almost all dissolved constituents for greater than 90% removal of TDS in one embodiment, and greater than 95% removal in a second embodiment. Commercial forward osmosis units are available from various vendors, such as Hydration Technology Innovations of Albany Oreg. and Oasys of Boston, Mass. Forward osmosis units may employ various membranes. Generally speaking, forward osmosis units are less prone to fouling than a conventional reverse osmosis unit.

Membrane Distillation ("MD") Unit:

In embodiments wherein the reduction in the hardness and silica level are not necessary, the produced water can be fed directly to the MD unit without the pretreatment step (e.g., via EC unit, CP unit, or filtration unit). In another embodiment, membrane distillation is employed as one of the steps after the solid separation step. In another embodiment, membrane distillation is employed as one of the steps after the filtration step. The MD process is a thermally driven transport of vapor, typically through a non-wetted porous hydrophobic membrane, suitable for applications in which water is the major component present in the feed solution.

In one embodiment, "direct contact" membrane distillation (DCMD) is used to remove the total dissolved solids and salinity in the water. In DCMD, both the warm vaporizing feed stream and the cold condensate stream (treated produced water feed) are in direct contact with the membrane distillation apparatus. The driving force for membrane distillation is the partial pressure differential between each side of the membrane pores. Both the feed and permeate aqueous solutions may be circulated tangentially to the membrane surfaces by means of circulating pumps. Alternatively, the solution may be stirred inside the membrane cell by means of a magnetic stirrer. The trans-membrane temperature difference induces a vapor pressure differential. Volatile molecules evaporate at the hot liquid-vapor interface, cross the membrane pores in vapor phase, and condense in the cold liquid-vapor interface inside the membrane module. The liquid feed water to be treated by DCMD is maintained in direct contact with one side of the membrane without penetrating the dry pores unless a trans-membrane pressure higher than the membrane liquid entry pressure is applied. The hydrophobic nature of the membrane usually prevents liquid solutions from entering membrane pores due to surface tension forces. Liquid-vapor interfaces are formed at the entrances of the membrane pores.

In one embodiment, the DCMD unit employs membrane of the type as disclosed in U.S. Pat. No. 8,167,143 and PCT patent publication WO 2012/097279, the disclosures of which are incorporated herein by reference. The membrane system employs hydrophobic hollow fiber membranes in a shell casing, with the fiber comprising any of regenerated cellulose (RC), cellulose acetate, and cellulose triacetate (CTA). In one embodiment the membrane module is configured and dimensioned to permit cross flow of the produced water (to be treated) relative to the hollow fibers. The hollow fiber module includes a central feed distributor tube, hollow fiber membranes positioned around the central feed distributor tube, end caps with ports for the flow of sweep air, and optionally a shell casing. The central feed distributor tube includes small holes to allow the removed oil to flow out radially on the shell side. Sweep air may be introduced into the bore of the hollow fibers in the tube side to remove permeated water vapor. Each membrane unit includes about 5,000 to 200,000 hollow fiber membranes in one embodiment; from 10,000 to 100,000 fiber membranes in a second embodiment. The membrane fibers have a length of 1 to 200 inches in one embodiment; from 5 to 100 inches in a second embodiment. The membranes have a wall thickness ranging from 2 to 100 μm in one embodiment; from 5 to 75 μm in a second embodiment; and from 10 to 50 μm in a third embodiment. The membranes have a surface area of about 100 cm$^2$ to about 2.0 m$^2$.

In yet another embodiment, the DCMD unit employs membranes of the type as disclosed in US Patent Publication No. US20110031100A1, the disclosure of which is incorporated herein by reference. The membrane is of a composite hydrophilic/hydrophobic type having a high vapor flux, comprising a hydrophilic polymer layer and a hydrophobic polymer layer. In one embodiment, the membrane has a vapor flux of at least about 50 kg/m$^2$-hr. The hydrophilic polymer layer comprises any of polysulfone, polyether sulfone, polyetherimide polyvinylidenefluoride, cellulose acetate, or combinations thereof. The hydrophobic polymer layer comprising a fluorinated surface-modifying macromolecule (SMM). In one embodiment, the SMM is poly(urethane propylene glycol) or poly(urea dimethylsiloxane urethane).

In one embodiment, after passing through the DCMD unit, the pretreated water contains as little as less than 5% of the original silica concentration; less than 25% of the original hardness causing ions such as calcium and magnesium; less than about 5 ppm oil; and less than 50% of the original dissolved organic carbon content.

The membrane distillation apparatus may be washed in different ways using different washing agents known to one of ordinary skill in the art. For example, a sodium hydroxide (NaOH) aqueous solution and deionized water may be used sequentially to wash the membrane when needed. In another example, dilute hydrochloric acid can be used to wash the membrane when needed.

Membrane distillation may be very useful for desalination of produced water. Membrane modules are modular and compact. The impact of salinity on water flux is minimal, since the vapor pressure decline for even a 10% brine solution is only 5% of pure water vapor pressure. The produced water may be pumped from the reservoir at temperatures of greater than about 50° C., and in some applications, at greater than about 70° C. If relatively cold water is run on the permeate side at about 25° C., a temperature differential of about 45° C. may be used to create a driving force for generating considerable water flux across the membrane. In one embodiment, the treated water on one side of the membrane is at a temperature of at least 5° C. less than the temperature of the pre-treated water. In another embodiment, the treated water is at a temperature at least 65° C. less than the temperature of the pre-treated water.

The DCMD unit removes at least 50% of residual silica and hardness in the water in one embodiment; at least 80% removal in a second embodiment, and at least 90% removal of residual silica and hardness in a third embodiment, for a steam-generation quality water or boiler quality. The chemical oxygen demand (COD) level, which is an indication of organic levels in the water, of the water after treatment in the DCMD unit is less than 10% of the initial level before treatment in the DCMD unit. The total COD level is less than 25 mg/L in one embodiment, and less than 20 mg/L in a second embodiment. Another indication of total organics removal efficiency is TOC, which is expected to be less than 10 mg/L after the DCMD treatment in one embodiment, and less than 5 mg/L in a second embodiment.

Ion Exchange (IE) Unit:

In some applications wherein the primary water treatment objective is removing the hardness and with a silica level of less than 100 ppm rendered acceptable, an ion-exchange unit is employed to capture the hardness in the produced water. In the IE unit, the hardness ions are "exchanged" and bound onto the resin, thus effectively removed from the water for least 95% of hardness removal in one embodiment; at least 98% of hardness removal in a second embodiment; and at least 99% hardness removal in a third embodiment.

In one embodiment, the feed to the IE unit can be desalinated water feed stream from the MD unit (or the FO unit). In another embodiment, the feed to the IE unit is a combination stream with a first portion being untreated produced water feed and a second portion being desalinated water feed stream from the MD unit (or the FO unit) for a combined TDS of less than 10,000 ppm. In a third embodiment, the feed to the IE unit is a combination stream with a first portion being untreated produced water feed and a second portion being desalinated water feed stream from the MD unit (or the FO unit) for a combined silica level of less than 150 ppm. In a fourth embodiment, the feed to the IE unit is a combination stream with a first portion being untreated produced water feed and a second portion being desalinated water feed stream from the MD unit (or the FO unit) for a combined silica level of less than 100 ppm. In a fifth embodiment, the feed to the IE unit is a combination stream with a first portion being untreated produced water feed and a second portion being desalinated water feed stream from the MD unit (or the FO unit) for a combined silica level of less than 100 ppm and a combined TDS of less than 10,000 ppm.

In one embodiment for treating oil free water with TDS of less than 5000 ppm, the IE unit comprises two beds of strong acid IE resin in series with the first bed removing the bulk of the hardness, and the second bed acting as a polisher to remove the last traces of calcium and magnesium. In one embodiment, the IE resin is a sulfonated copolymer of styrene and divinylbenzene, which functions by exchanging sodium ions for calcium and magnesium ions. The resin can be regenerated with sodium chloride brine.

In another embodiment for treating produced water with TDS between 5000-8000 ppm, the IE unit employs two beds of IE resin in series, with a strong acid followed by a weak acid. The strong acid as the primary softener to remove majority of the hardness, followed by the weak acid to ensure the final softness of the water meets spec. In one embodiment, the weak acid resin is a carboxylic acid group within an acrylic divinylbenzene matrix with a strong selectivity for calcium and magnesium. The resin can be regenerated by treatment with HCl to remove the calcium and magnesium, then with caustic soda to convert the resin back to the sodium form.

In one embodiment with the produced water having TDS of >8000 ppm, the system comprises two beds in series with a weak acid followed by a weak acid bed to reduce the hardness to a level meeting spec, e.g., to less than 1 ppm.

System Configurations & Applications:

The produced water for treatment in the system can be from different sources with different compositions/properties with different treatment requirements. The feed from different sources can be combined for a particular suitable treatment. The feed stream can also be split as feedstock to different treatment units in the system, e.g., in one embodiment, some of the water is treated in one of the treatment units such as the EC unit, and some remains untreated for combination with the treated water stream from the EC unit as a new feed stream for subsequent treatment such as in an IE unit for hardness removal. In another embodiment wherein the final TDS is not an important quality factor, produced water containing a high level of hardness is treated in a warm lime process, with the treated stream being combined with untreated produced water from another source such that the combined TDS is less than 15,000 ppm. The combined stream can be treated in an IE unit for hardness removal to less than 1 ppm. In another embodiment, the combined stream for subsequent hardness treatment has a total TDS of <5,000 ppm.

The above described water treatment units (e.g., EC unit, solid separation unit, filtration unit, DCMD unit, etc.) can be configured into one system as an on-site installation, or as a mobile unit for use on-site or off-site. Mobile herein means that the water treatment system can be moved from one location to another, e.g. distances of at least 0.1 miles between the locations. In one embodiment, the units are installed on a converted tanker that can move (sail) from one FPSO or off-shore production unit to another for the treatment of produced water. In another embodiment, each unit is designed and configured for easy access on a trailer (or box trailer, or a cargo trailer) as a modular unit that can be mobile (transportable), reused, interchangeable for assembly according to various configurations, forming a complete "water treatment plant" or deployed as stand-alone units.

For remote onshore drilling or production environment, offshore production facilities, or smaller sized production facilities such as single service processing of parcels of less than 300,000 barrels of fluids (produced water) per day, routine service or the building of a tailored produced water treatment system can be expensive and may not economically feasible. The system employing the modular units can be scaled to the appropriate size, transported from one facility to another, and at the destination, constructed (interconnected) per a particular modular design so as to be functional and particularly suitable for these facilities.

The modular systems can be assembled with the individual units being interconnected according to tailored configurations suitable for the treatment of the produced water at the facility, e.g., a modular system including EC unit, a modular system without EC unit, a modular system using CP unit (instead of EC), a system employing ceramic and polymeric membranes, multiple modular systems running in parallel or multiple units within a system running in parallel to handle larger treatment loads. In one embodiment, the modular unit contains at least one of each: EC unit, solid separation unit, high-temperature UF unit (employing ceramic or high-temperature polymeric membrane), membrane distillation unit (e.g., DCMD, VMD or vacuum membrane distillation, etc.), and forward osmosis unit.

The modular system can be configured to run in serial (sequential) mode in one embodiment, e.g., the individual units run sequentially with output (effluent stream) from one unit being passed on to another unit for further treatment, e.g., filtrate from the UF unit being further treated in the DCMD, dilute draw from a FO unit being further treated in a DMCD unit to produce desalinated water and regenerate the draw for re-use in the FO unit, etc. In another embodiment the system is configured to run in parallel mode, e.g., filtrate from the UF unit is split for processing in both the DCMD and FO units. In yet another embodiment, the system is configured for some of the units to be online (e.g., the DCMD unit running) and some units being off-line not in use (e.g., FO unit not being used). The system can also be configured to be running in both parallel and sequential modes, e.g., multiple UF units being employed in series and both DCMD and FO units being used for the removal of dissolved organics, etc.

Reference will be made to the figures that schematically illustrate various embodiments of different configurations for the treatment of produced water, particularly for steam generation.

FIG. 1 illustrates an embodiment of a process and a system that employs electrocoagulation to treat water to produce steam at significant energy savings. In the system, produced water feed 11 passes through screen 10 for the removal of large particles that may damage downstream equipment. The screened feed stream 21 is treated in EC unit 20, for the removal of at least 95% of the hardness and 90% of the silica respectively. In one embodiment, additional additives 22 such as flocculants, oxidizing agents and the like can also be added to the EC unit 20. In another embodiment, the pH of the screened feed stream 21 is adjusted to a pre-select pH with the addition of at least a base 12 prior to treatment in the EC unit. A clarifier 30 (or other applicable solid removal units) is used for the removal of any flocs or precipitates as wastestream 32. The clarified water 41 is sent to a high-temperature filtration unit 42 for the removal of any free oil 42, generating a treated water stream meeting specs for hardness and silica for use in steam generation.

Figure 2:
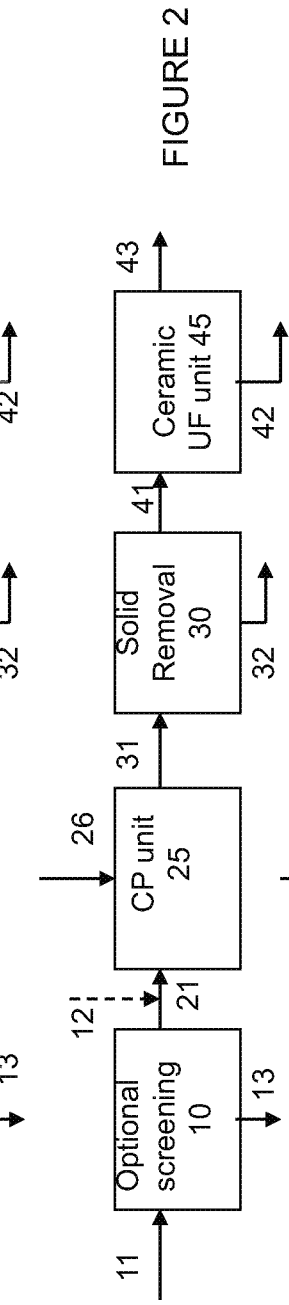
FIG. 2 is block diagram of another embodiment, wherein chemical precipitation is used in conjunction with ceramic ultra-filtration for produced water treatment.

FIG. 2 is an alternative configuration, wherein instead of an EC unit, a chemical precipitation (CP) unit 25 is employed with the addition of any of lime 12, caustic, and/or magnesium compounds 26, and wherein a ceramic UF unit 45 is used for high-temperature filtration to remove at least 90% of the free oil in the treated water stream 41.

Figure 3:
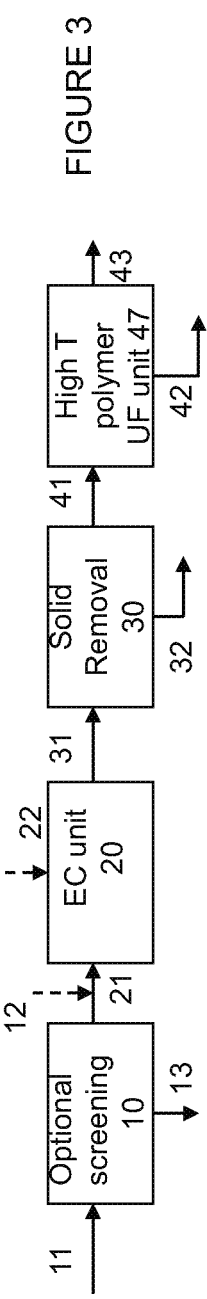
FIG. 3 is block diagram of a third embodiment, wherein an EC unit is used in conjunction with high temperature polymer ultra-filtration for produced water treatment.

FIG. 3 is yet another variation of the configuration in FIG. 1, wherein a high temperature polymer UF unit 47 is employed to remove free oil in the treated water stream 41 prior to steam generation.

Figure 4:
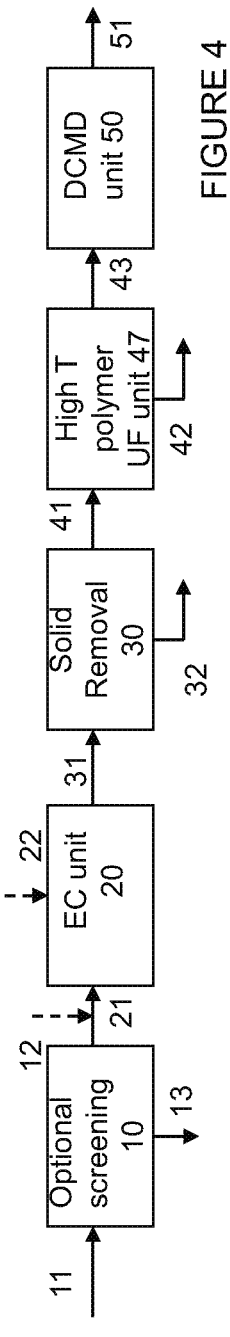
FIG. 4 is a block diagram showing a variation of the system/process configuration of FIG. 1, further comprising a direct contact distillation membrane unit for further process treatment of the produced water.

FIG. 4 is a variation of the configuration in FIG. 3, wherein the treated stream 43 is further processed in a DCMD unit 50 for the removal of dissolved organic constituents, generating a high quality treated stream 51 for steam generation.

FIG. 5 is yet another variation of the configuration in FIG. 3, wherein the treated stream 43 is sent to a FO unit 55 (instead of a DCMD unit) for the removal of dissolved organic constituents, generating a high quality treated stream 51 for steam generation.

FIG. 6 employs the same system configuration in FIG. 5 for the treatment of produced water. However in this embodiment, an untreated produced water stream 52 having a low concentration of TDS can be combined with stream 43 and fed directly to the FO unit for further treatment. In one embodiment, the ratio of untreated water stream 52 to treated water stream 43 is controlled such that the final treated water stream 51 remains within spec.

In the configuration of FIG. 7, the produced water has a sufficiently low silica level to start and only hardness removal is needed. After pretreatment with screening in unit 10 and ceramic UF unit 45, the treated water 43 is desalinated in DCMD unit 50, generating a treated stream 43. An untreated produced water stream 52 having a low concentration of TDS can be combined with treated stream 431 for further treatment in IE unit 60 to remove hardness ions to a concentration of less than 1 ppm.

As shown in some figures, pretreatment in the EC unit 20 and/or UF unit is desirable before employing a MD step to prevent flux decline and scale build-up. The EC unit can improve the efficiency of the membrane distillation flux by reducing the scalants (silica and hardness) and foulants (free oil and dissolved organics). In embodiments with minimum gain/loss of energy in steam generation, the use of EC is particularly suitable. When operated at reasonably high temperatures, the EC process desirably adds energy to the produced water. The EC process raises the temperature of the water, which increases the driving force in the subsequent membrane distillation step. Thus, there is a synergistic combination in providing a pretreatment step of EC, followed by an MD process. The energy the EC process adds to the water assists in "driving" the membrane distillation process.

The use of high-temperature ultra-filtration is also desirable for embodiments with minimum gain/loss of energy in steam generation. In one embodiment with the use of ceramic or high-temperature polymer materials for membranes, the clarification step can be eliminated with the solid removals being carried out in the ultra-filtration step. In other embodiments, ultra-filtration may be bypassed if the membrane distillation unit is tolerant to residual suspended solids and residual dissolved organics after the EC treatment.

It should be noted that separate water treatment units are configured in a permutable fashion for the system to be operating according to any of the configurations described above depending on the properties of the produced water source, with some of treatment units to be online, some on stand-by mode, parallel mode with water treatment by both EC and FO units, series mode with ceramic UF filtration prior to treatment by the DCMD, split feed treatment with some of the produced feed by-passing one or more of the treatment units, etc.

EXAMPLES

The invention is shown by example in the illustrated embodiments. However, it is recognized that other embodiments of the invention having a different configuration but achieving the same or similar result are within the scope and spirit of the claimed invention.

Example 1

Pretreatment by Electrocoagulation (EC)—Produced Water

Produced water from a oil producing field was collected and analyzed for its water quality shown below:

|  | mg/L |
|---|---|
| Anions | |
| Bicarbonate, $HCO_3^{-1}$ | 1395 |
| Carbonate, $CO_3^{-2}$ | 0.0 |
| Chloride, $Cl^{-1}$ | 3940 |
| Hydroxide, $OH^{-1}$ | 0.0 |
| Sulfate, $SO_4^{-2}$ | 177 |
| Sulfide, $S^{-2}$ | 0.0 |
| Sulfite, $SO_3^{-2}$ | 0.0 |
| Cations | |
| Ammonium, $NH4^{+1}$ | 0.00 |
| Barium, $Ba^{+2}$ | 0.76 |
| Boron, $B^{+3}$ | 92.8 |
| Calcium, $Ca^{+2}$ | 50.9 |
| Iron, $Fe^{+3}$ | 0.00 |
| Magnesium, $Mg^{+2}$ | 16.4 |
| Potassium, $K^{+1}$ | 115 |
| Sodium, $Na^{+1}$ | 2540 |
| Strontium, $Sr^{+2}$ | 0.00 |
| Silica, as $SiO2$ | 293.0 |
| Sodium, $Na^{+1}$ (Calc.) | 2541.0 |
| Chloride, $Cl^{-1}$ (Calc.) | 4132.0 |

This water is high in silica and hardness. It was treated in a EC reactor at an applied current of 10-15 A and a pH range of 7.5-9.5. The results are shown in Table 1, showing a substantial reduction in silica, calcium, and magnesium.

TABLE 1

| Contaminant | Untreated Produced Water (ppm) | Treated Produced Water (ppm) | % Reduction |
|---|---|---|---|
| Silica (SiO2) | 293 | 15 | 95 |
| Calcium | 50.9 | 4.6 | 91 |
| Magnesium | 25.9 | 2.1 | 87 |

Example 2

EC Pretreatment—Tar Sand Wastewater

EC process has been shown in sources to treat tar sand wastewater as the feed. Results are shown in Table 2, showing a large decrease in total suspended solids and total organic carbon.

TABLE 2

| Contaminant | % Removal |
|---|---|
| Total suspended solids | 99 |
| Total organic carbon | 50-95 |

Example 3

EC Pretreatment—Oil Shale Wastewater

Example 1 was repeated but with oil shale wastewater as the feed. The contaminant removal percentage of dissolved organic carbon was about 17-36 percent removal.

Example 4

Effect of Temperature

The produced water sample from Example 1 was run through the EC bench scale unit at a feed water temperature of 16° C. The temperature of the treated water increased due to energy input from the EC process as shown in Table 3.

TABLE 3

Power Input Impact on Treated Water Temperature

| Run | Current (A) | Power (W) | Treated Water Temperature ° C. | Increase in temperature, ° C. |
|---|---|---|---|---|
| 1 | 11 | 660 | 28 | 12 |
| 2 | 9 | 495 | 27 | 11 |
| 3 | 7 | 343 | 23 | 7 |
| 4 | 5 | 125 | 22 | 6 |
| 5 | 3 | 60 | 21 | 5 |
| 6 | 1 | 11 | 19 | 3 |

Example 5

Flux Performance in DCMD

From various literature sources, as shown in Table 4, high water flux can be achieved. This table shows water flux as a function of the TDS and driving force. It is shown to be high for membrane distillation, and desirably can be applied with very high TDS water where reverse osmosis may not be applicable. It also shows that the flux is independent of the feed water TDS. The results further indicate that the process can be applied for many applications in the shale gas reservoir production industry such as in desalinating flowback water which have a salt concentration of at least 6 wt % or more.

TABLE 4

| Water Source | Driving Force (Delta C) | Flux (gfd) |
|---|---|---|
| City Water (low TDS) | 70 | 28.6 |
| Brine (6 wt %) | 65 | 11.5 |
| Brine (10 wt %) | 65 | 11.5 |
| Brine (6 wt %) | 45 | 6.2 |

Example 6

FO Performance

In another example, produced water from Example 1 was treated by FO membrane for 24 hours. 1 L of 1.25 M NaCl was used as draw solution to recover over 45% of produced water at an average flux of 8.1 LMH. For two consecutive experiments, no flux drop was observed, indicating low or no fouling. The results in Table 5 show significant reduction in total hardness by FO treatment. With respect to removal of dissolved organic carbon, the feed water shows an initial concentration of 441 mg/L, the concentrated feed water has a concentration of 780 mg/L, and the feed water shows a final concentration of 2.35 mg/L. Thus forward osmosis membranes can be seen to reduce hardness and scale causing constituents of produced water. In some applications, extensive pretreatment may not be required. FO osmosis can useful in applications for desalinated water wherein boron reduction is desired.

TABLE 5

| Concentration | Feed water (initial mg/L) | Draw water (final mg/L) |
|---|---|---|
| Ca | 50.9 | 1.1 |
| Mg | 25.9 | 2.1 |

TABLE 5-continued

| Concentration | Feed water (initial mg/L) | Draw water (final mg/L) |
|---|---|---|
| Silica | 293 | 9.4 |
| Boron | 92.8 | 8.8 |

Example 7

In an example of a produced water flow rate of 150,000 BWPD (barrels of water per day) for steam generation purpose, a polymeric UF membrane is used for the removal of dissolved organics. The produced water temperature is reduced from ~75° C. to 45° C. before being introduced into the UF unit, wherein the heat content is transferred to another medium via heat exchanger and transferred back to the water after the dissolved organics are separated/removed. For a typical heat exchanger efficiency of 85%, it is estimated that about 320,000 MM BTU is lost, or an operational loss of about $1.6 million a year at a natural gas price of $5/MM BTU.

Example 8

Example 7 is repeated but with the use of ceramic membranes for the removal of organics from a produced water flow rate of 150,000 BWPD (barrels of water per day) for steam generation purpose. Produced water at ~75° C. can be fed directly into the UF unit for oil removal for subsequent steam generation purposes, for a saving of at least $1.6 million a year as there is no need for heat exchanger systems.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A method for treating produced water for steam generation, the method comprising:
providing a source of produced water to be treated, the water having contaminants selected from the group of total organic content ("TOC") and total dissolved solids ("TDS") as silica and hardness ions;

removing at least a portion of the silica and hardness ions as suspended solids by subjecting the produced water to an electrocoagulation process;

removing at least a substantial portion of the suspended solids in a polymer filtration unit, the filtration unit operating at a temperature of at least about 50 degrees Centigrade;

lowering the water temperature of the produced water;

further treating the produced water within the filtration unit, further wherein the filtration unit comprises at least one membrane selected from the following:

polyethersulfone (PES) membrane, polyacrylonitrile (PAN) membrane, polyvinylidene difluoride (PVDF) membrane, sulfonated polyether ether ketone (PEEK) membrane, Nafion membranes (sulfonated tetrafluoroethylene based fluoropolymer-copolymer), poly(phthalazinone ether sulfone) membrane (PPES), poly(phthalazinone ether ketone) membrane (PPEK), poly(phthalazinone ether fulfone ketone) membrane (PPESK);

generating a pre-treated water;

passing the pre-treated water to a forward osmosis (FO) unit employing a draw solution selected comprising at least one of polyvalent osmotic ions, monovalent osmotic ions and combinations thereof;

subsequently treating the pre-treated water in a direct contact membrane distillation (DCMD) unit, wherein the DCMD unit employs a composite membrane comprising a hydrophilic polymer layer and a hydrophobic polymer layer.

2. The method of claim 1, wherein no heat energy is added to or removed from the pre-treated water prior to passing the pre-treated water to a forward osmosis unit.

3. The method of claim 1, wherein the draw solution comprises at least one of NaCl, $Na_2SO_4$, $AlCl_3$, $MgSO_4$, $NH_4HCO_3$, $MgCl_2$ and mixtures thereof.

4. The method of claim 1, wherein the electrocoagulation process employs sacrificial electrodes.

5. The method of claim 1, wherein the pH of the produced water is adjusted to a pre-select pH prior to removing at least a portion of the silica and hardness ions by the electrocoagulation process.

6. The method of claim 5, wherein the pre-select pH ranges from 7.2 to 11.5.

7. The method of claim 1, wherein the filtration unit to removes at least 70% of the TOC as free oil prior to passing the pre-treated water to a forward osmosis unit.

8. The method of claim 1, wherein the filtration unit employs additionally comprises a ceramic membrane to remove at least 70% of the TOC as free oil.

9. The method of claim 1, further comprising passing the produced water through a screen to remove large particulates prior to subjecting the produced water to an electrocoagulation process.

10. The method of claim 1, further comprising:

passing a dilute draw from the FO unit to the direct contact membrane distillation (DCMD) unit to generate a treated stream and a draw stream for re-use in the FO unit.

11. The method of claim 1, wherein no heat energy is added to or removed from the at least a portion of the pre-treated water prior to treating in the DCMD unit.

12. The method of claim 1, wherein the DCMD unit employs at least a hydrophobic hollow fiber membrane.

13. The method of claim 12, wherein the membrane fibers have a length ranging from 1 to 200", a wall thickness ranging from 2 to 100 μm.

14. The method of claim 1, wherein the hydrophilic polymer comprises any of polysulfone, polyether sulfone, polyetherimide polyvinylidenefluoride, and cellulose acetate.

15. The method of claim 14, wherein the hydrophobic polymer layer comprises fluorinated surface-modifying macromolecule (SMM).

* * * * *